Patented Dec. 19, 1950

2,534,743

UNITED STATES PATENT OFFICE 2,534,743

SAND MOLD COMPOSITION

Shirley M. Vincent, Northampton, Mass., assignor to Monsanto Chemical Company, St. Louis, Mo., a corporation of Delaware No Drawing. Application November 13, 1948, Serial No. 59,970

5 Claims. (Cl. 22—188)

This invention relates to sand molds for use in the casting of metals and in particular, relates to new binding agents for making such molds.

Numerous materials have been suggested as binders in the manufacture of sand molds, as for example, linseed oil, alkyd resins and phenolic resins. However, certain shortcomings attend the use of these prior binders and it is desirable to provide a new type of binding agent for this purpose.

It is an object of this invention to provide new sand molds. A further object is to provide new molding compositions for preparing sand molds for the casting of metals.

These and other objects are attained according to this invention by providing sand mold compositions in which the binding agent comprises the reaction product of a polyhydric alcohol and the product obtained by heating mixtures of maleic anhydride and the vinyl esters of the carboxylic acids contained in tall oil. Thus, it has been discovered that sand molds containing as the binding agent such a reaction product are particularly advantageous for use in the casting of metals.

The following examples are illustrative of the present invention but are not to be construed as limitative thereof. Where parts are mentioned, they are parts by weight.

Example I

A mixture of 160 parts of the vinyl esters of tall oil and 10 parts of maleic anhydride is heated in an inert atmosphere up to 200° C. over a period of 10–15 minutes. Thereafter, 7 parts of glycerine are added and the mixture heated at 190–200° C. for 15 minutes. The product is found to have an acid number of 29.

48 parts of the above described resinous reaction product are dissolved in 24 parts of xylol and the resulting solution is then mixed with 1600 parts of foundry sand to which 80 parts of water have been added. From the resulting mixture, sand cores in dog-bone shape are pressed at ordinary temperatures and then baked for three hours in a circulating air oven at a temperature which is gradually raised from 100° C. to 230° C. The resulting moldings are found to have a tensile strength of 83 pounds per square inch.

In contrast to the strength values given above, an otherwise similarly prepared sand core, except that the binder is unmodified vinyl esters of tall oil, possesses a tensile strength of only 65 pounds per square inch.

Example II

Example I is repeated except that the amount of maleic anhydride is increased to 25 parts and the amount of glycerine is increased to 18 parts and the resinous reaction product has an acid number of 65.

Sand cores prepared as in Example I using this binder are found to have a tensile strength of 100 pounds per square inch.

From Examples I and II, it is to be seen that sand molds having as a binder the reaction product of glycerine and the product obtained by heating mixtures of maleic anhydride and vinyl esters of tall oil are especially valuable. In particular, it is to be noted that the sand molds of the invention have especially high tensile strengths and in this respect exceed the corresponding values for molds containing unmodified vinyl esters of tall oil as the binding agent.

Numerous variations may be introduced into the binding agents of the invention as illustrated by the specific examples. Thus, from 500 to 3000 parts by weight of the vinyl esters of tall oil may be reacted with 100 parts by weight of maleic anhydride. Generally, the amount of polyhydric alcohol which is used is chemically equivalent to the amount of maleic anhydride employed. However, for applications where it is not necessary to maintain a low acidity in the binder, a deficiency of the polyhydric alcohol may be employed, for example, up to a 25% deficiency. Conversely, an excess of the polyhydric alcohol may be used to provide a binder with reduced acidity, for example, a 5-25% excess may be used. Usually, the amount of polyhydric alcohol is correlated with the extent of reaction to produce a resinous reaction product with an acid number of less than 100.

Substantial variations in the temperatures used in forming the resinous binder of the invention are permissible, as is apparent to those skilled in the art. The formation of the maleic anhydride adduct takes place very quickly and is conveniently carried out while raising the temperature to one suitable for reaction with the polyhydric alcohol. Thus, in the case of the resins prepared in Examples I and II, when the temperatures of the mixtures of maleic anhydride and vinyl esters of tall oil reaches about 85° C. a precipitate forms indicating the formation of the adduct. This precipitate slowly disappears during the reaction with the glycerine. The temperatures used in the reaction with the polyhydric alcohol may be substantially varied but are conveniently in the range 180°–250° C.

In place of glycerine other polyhydric alcohols may be employed such as trimethylol propane, trimethylol ethane, pentaerythritol, erythritol, sorbitol, mannitol and the like. Surprisingly, it is found that the increased strength characteristics of the solution are not attained if a dihydric alcohol is substituted for glycerine. Sand molds containing such resins as the binding agent at best exhibit no improvement over the use of unmodified vinyl esters of tall oil.

While the use of the binding agents of the invention makes possible sand molds having increased strength characteristics, it may also be desirable to prepare sand molds with a lower binder content without sacrifice in strength characteristics.

The amount of binder may be substantially varied to meet particular requirements. However, an excess of binder is usually avoided since deleterious effects may result from the presence of an excessive amount of binder. In general, it is found that at least 0.5% of the binder, based on the amount of sand compound, is desirable and usually not more than 10 or 15% is required to achieve the necessary strength requirements. For most purposes, it is found that 1–5% of the binder represents a desirable amount to use.

As indicated by the examples, a small amount of water is incorporated in the mold compositions for the purpose of increasing the green strength of the mix, i. e., the cohesiveness prior to baking, thus, enhancing the handling characteristics thereof. The amount of water may be varied to conform with the results which are desired and usually 1–5% water based on the amount of mold composition is sufficient.

The temperatures used in baking the molds may be substantially varied but usually do not exceed 250–300° C. Under some circumstances, catalysts may be included, for example, such peroxides as lauroyl peroxide, benzoyl peroxide, etc.

As is known, tall oil is a by-product of the process of paper manufacturing and consists essentially of rosin acids and fatty acids, the latter of which are similar in general properties to the fatty acids of semi-drying fatty oils. The rosin and fatty acid constituents are the major constituents and are frequently present in about equal amounts.

Examples of tall oils which may be used in making the vinyl esters thereof include the product sold as Arizona tall oil and containing 32–48.5% rosin acids, 47.5–32.5% fatty acids and 10–12% unsaponifiable material. Other tall oils may be used, such as Gulf States tall oil containing 32–40.5% rosin acids, 47.5–40% fatty acids and 10–12% unsaponifiable material; "Indusoil" which is made up of 55–60% fatty acids, 34–38% rosin acids, calculated as abietic acid and 6–10% sterols, higher alcohols, etc.; "Ligro" which is made up of 45–50% fatty acids, 42–48% rosin acids, calculated as abietic acid and 6–9% sterols, higher alcohols, etc.; or other tall oils which, in general, contain 25–65% rosin acids, 30–75% fatty acids and 5–20% non-acids, sterols, etc.

The tall oil acids may be vinylated to form the corresponding tall oil vinyl esters by reaction by acetylene. A description of one method for preparing vinyl esters of tall oil is set forth in U. S. Patent No. 2,228,365.

The tall oil vinyl esters used in the examples are made by treating Arizona crude tall oil with acetylene in the presence of 2% zinc oxide, based on the amount of tall oil, at 200° C.

The foregoing description is given in illustration and not in limitation of the invention as set forth in the appended claims.

What is claimed is:

1. A sand mold composition suitable for use in the casting of metals comprising a foundry sand and a binder consisting essentially of a reaction product of a polyhydric alcohol taken from the group consisting of glycerine, trimethylol propane, trimethylol ethane, pentaerythritol, erythritol, sorbitol, and mannitol and the product obtained by heating a mixture of 500–3000 parts by weight of tall oil vinyl esters with 100 parts by weight of maleic anhydride, said reaction product having an acid number of less than 100.

2. A mold composition as defined in claim 1 in which 0.5–15 parts of the binder are used for every 100 parts of sand.

3. A mold composition as defined in claim 1 in which 1–5 parts of binder are used for every 100 parts of sand.

4. A mold composition as in claim 1 wherein the polyhydric alcohol is glycerine.

5. A sand core for use in the casting of metals comprising foundry sand and a reaction product of glycerine and the product obtained by reacting 500–3000 parts by weight of a tall oil vinyl ester with 100 parts by weight of maleic anhydride, said reaction product having an acid number of less than 100, said sand core having been heat-treated to cure the binder.

SHIRLEY M. VINCENT.

REFERENCES CITED

The following references are of record in the file of this patent:

UNITED STATES PATENTS

| Number | Name | Date |
|---|---|---|
| 2,047,398 | Voss et al. | July 14, 1936 |
| 2,228,365 | Reppe et al. | Jan. 14, 1941 |
| 2,270,947 | Hough | Jan. 27, 1942 |
| 2,331,805 | Scrutchfield | Oct. 12, 1943 |